(12) United States Patent
Egger et al.

(10) Patent No.: US 12,595,133 B2
(45) Date of Patent: Apr. 7, 2026

(54) CONVEYOR BELT CALIBRATION DEVICE

(71) Applicants: James Lee Egger, Jupiter, FL (US);
Robert Paul Egger, Jupiter, FL (US)

(72) Inventors: James Lee Egger, Jupiter, FL (US);
Robert Paul Egger, Jupiter, FL (US)

(*) Notice: Subject to any disclaimer, the term of this patent is extended or adjusted under 35 U.S.C. 154(b) by 118 days.

(21) Appl. No.: 18/627,803

(22) Filed: Apr. 5, 2024

(65) Prior Publication Data

US 2024/0343498 A1 Oct. 17, 2024

Related U.S. Application Data

(60) Provisional application No. 63/496,197, filed on Apr. 14, 2023.

(51) Int. Cl.
*B65G 43/00* (2006.01)

(52) U.S. Cl.
CPC ...... *B65G 43/00* (2013.01); *B65G 2203/0291* (2013.01); *B65G 2811/095* (2013.01)

(58) Field of Classification Search
CPC ............ B65G 43/00; B65G 2203/0291; B65G 2811/095
USPC .......................................... 198/502.1, 502.4
See application file for complete search history.

(56) References Cited

U.S. PATENT DOCUMENTS

| | | | | |
|---|---|---|---|---|
| 3,743,913 A | * | 7/1973 | Rebucci ................... | G01B 3/12 |
| | | | | 340/676 |
| 4,259,918 A | * | 4/1981 | Ward ..................... | B65G 45/10 |
| | | | | 116/200 |
| 2021/0138800 A1 | * | 5/2021 | Terradellas Callau ...................... | |
| | | | | B41J 11/007 |
| 2024/0327131 A1 | * | 10/2024 | Campanari ............ | B65G 17/12 |

OTHER PUBLICATIONS

CN101939238 (Year: 2011).*

* cited by examiner

*Primary Examiner* — Gene O Crawford
*Assistant Examiner* — Lester Rushin, III
(74) *Attorney, Agent, or Firm* — McHale & Slavin, P.A.

(57) ABSTRACT

A device for calibrating a conveyor belt comprising a housing with a remote controlled sensor assembly. The remote controller is secured to the housing for storage and shipping, the controller operating as a guard for the stored sensor assembly. When the remote controller is detached, the sensor assembly used to calibrate the conveyor belt is exposed. The housing is set adjacent a conveyor belt; the sensor assembly is set onto the conveyor belt that is to be measured. Jogging the conveyor belt at set intervals, the sensor assembly self-aligns while measuring the distance traversed and calculates the appropriate length correcting or speed that can be inputted to a conveyor belt control system.

20 Claims, 13 Drawing Sheets

REMOTE CONTROL
ELECTRONICS DESIGN

DEPLOYABLE FIXTURE ELECTRONICS DESIGN

CONVEYOR BELT CALIBRATION DEVICE

PRIORITY CLAIM

In accordance with 37 C.F.R. 1.76, a claim of priority is included in an Application Data Sheet filed concurrently herewith. Accordingly, the present invention claims priority to U.S. Provisional Patent Application No. 63/496,197, entitled "CONVEYOR BELT CALIBRATION DEVICE", filed Apr. 14, 2023. The contents of the above referenced application are incorporated herein by reference in its entirety.

FIELD OF THE INVENTION

The field of the invention is calibration devices and, in particular, to an improved conveyor belt calibration device.

BACKGROUND OF THE INVENTION

Servo-controlled conveyor belts are used in modern industries that require material handling with precise control. For instance, most modern manufacturing processes employ servo-controlled conveyor belts for the automated movement of components between different stages of production. The servo-controlled conveyor belt allows for precise control over speed and positioning required in assembly lines. Servo-controlled conveyors are also commonly found in packaging lines where accurate and synchronized movement of packages is necessary, wherein the conveyor lines enable efficient handling of products during the packaging process and may accommodate variable speeds for different packaging requirements. In the food and beverage industry, servo-controlled conveyor belts are used for transporting products during processing, packaging, and sorting. Automated warehouses and distribution centers utilize servo-controlled conveyors for sorting and transporting packages with the ability to control speed, direction, and positioning to control the flow of goods. Servo-controlled conveyor systems are commonly used in automotive manufacturing for the assembly and transportation of vehicle components along the production line. In the electronics industry, like the automotive industry, servo-controlled conveyors are employed to transport components through the production line and can provide exact positioning of products for purposes of welding, soldering, assembling, inspection, and/or testing processes.

A common objective when using conveyor belts is to provide precise movement of components which contribute to increased efficiency, reduced errors, and improved overall productivity. Servo-controlled conveyor belts utilize servo motors for precise control and automation. A servo motor provides feedback control for adjusting its position to maintain a desired output. Servo control allows for precise speed and position control, making it possible to optimize the movement of components places on the conveyor belt. The servo-controlled conveyor belt provides high precision in controlling speed and position, or enables variable speeds along the conveyor belt. Servo-controlled conveyor belts can be used in automated systems where items need to be transported and processed without manual intervention. Servo systems typically include feedback devices such as encoders, which provide real-time information about the motor's position allowing the system to make continuous adjustments to maintain the desired position and speed. The precise control offered by servo motors allows for accurate positioning of items on the conveyor belt finding application in industries such as manufacturing, packaging, and logistics, where precise and automated movement of goods is essential for efficiency and quality control.

However, conveyor belt systems can become uncalibrated due to wear, tear, stretching or a combination thereof which can cause a conveyor belt line to shut down. In an effort to prevent systems from becoming unsynchronized, routine maintenance is periodically scheduled. A common maintenance procedure in the industry employs three individuals to calibrate a single conveyor belt using a tape-measure/ruler, which takes about twenty minutes. Use of multiple individuals to check the calibration is costly both in time and manpower. Not only the manual checking dependent upon human interpretation, improperly training regarding calibration can result in problems when there was none.

What is needed in the industry is a device capable of calibrating a conveyor belt in minimal time requiring a single individual employing a digital sensor to eliminate human error.

SUMMARY OF THE INVENTION

Disclosed is a remote controlled calibration device that is self contained for ease of storage and protection of the calibration fixture. The remote controller detaches from a housing containing a deployable fixture. Upon detachment of the remote controller, power to the controller and fixture is automatically turned on. With the controller detached, a wheel sensor held within the housing can be deployed through an opening otherwise concealed by the controller. The housing is placed on a fixed surface and the deployable fixture is set onto a conveyor belt being measured. The exposed wheel sensor slides out of the housing and is set onto the conveyor belt that is to be measured. When an operator begins jogging the conveyor belt at set intervals, the wheel sensor automatically begins measuring the distance traversed, and when the conveyor belt stops, it will send the signal to the remote, where the exact length is displayed and then can be inputted into the conveyor belt control system for calibration. Alternatively, the distance traversed can be sent actively to the remote for instantaneous display or calculation of belt speed. When the calibration check is complete, the wheel sensor is returned to the housing. The remote is then attached to the housing by enclosing the wheel sensor within the housing. By placement of the wheel sensor within the housing and magnetically attaching the remote control, sensitive sensors are protected for purposed of storage and shipping. When the remote and wheel sensor are placed into a storage position, power to the components is shut off. A 5-volt DC barrel jack is coupled to the housing and used to recharge the battery used in the remote control and the battery used in the housing, while remote and wheel sensor are in a storage position.

An objective of the invention is to provide a self contained housing for storage and protection of a conveyor belt calibration device comprising a wheeled length sensor and remote controller.

Still another objective of the invention is to provide a conveyor belt calibration device with a digital readout that can be performed by a single individual in about three minutes, with the calibration data available to be inputted to the tested calibration system.

Another objective of the invention is to provide a compact, lightweight, and portable wireless calibration device wherein a remote controller and measuring device is removably attached to an enclosure.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE INVENTION

Figure 1:
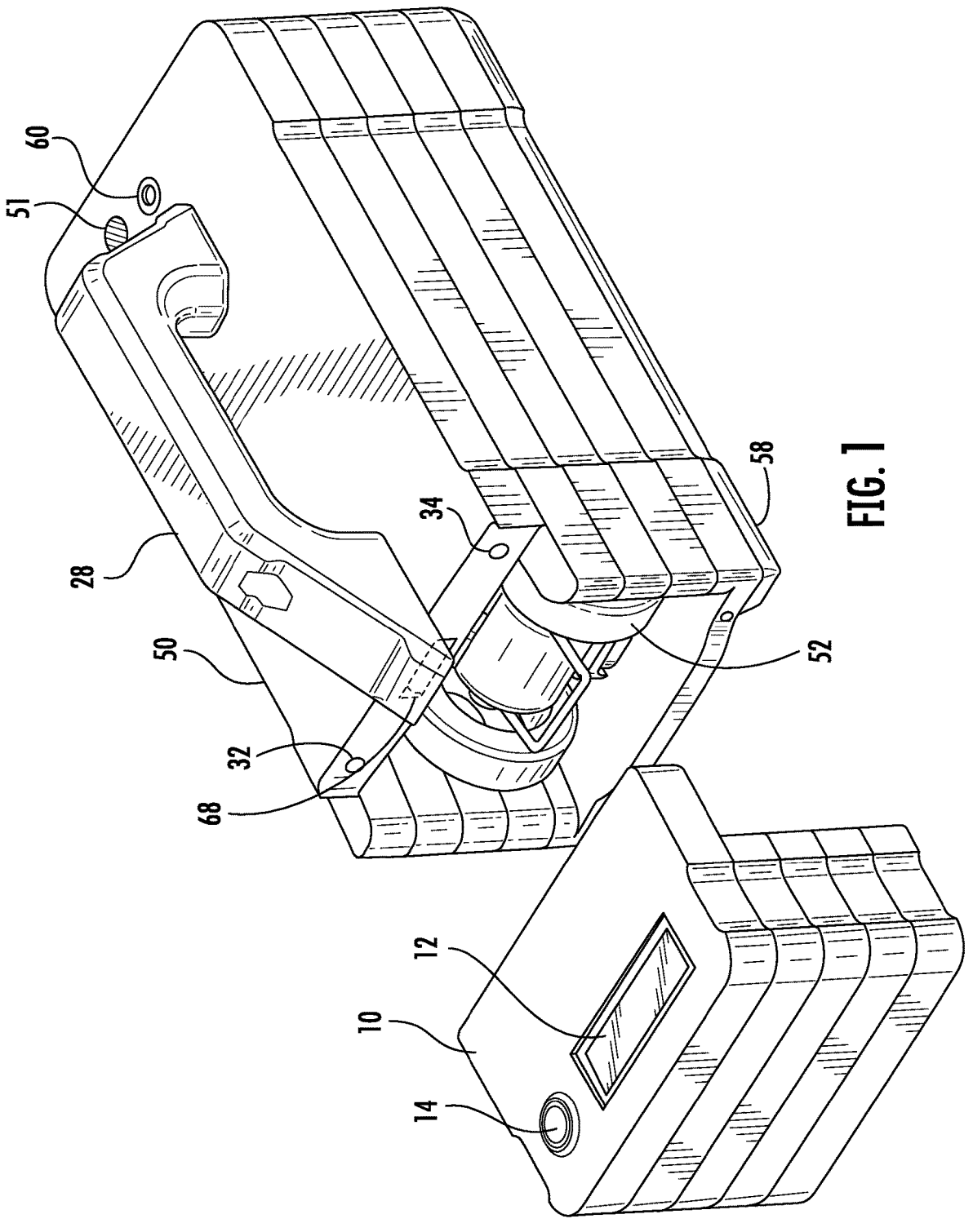
FIG. 1 is an exploded view of the remote controller and a housing.
Figure 2:
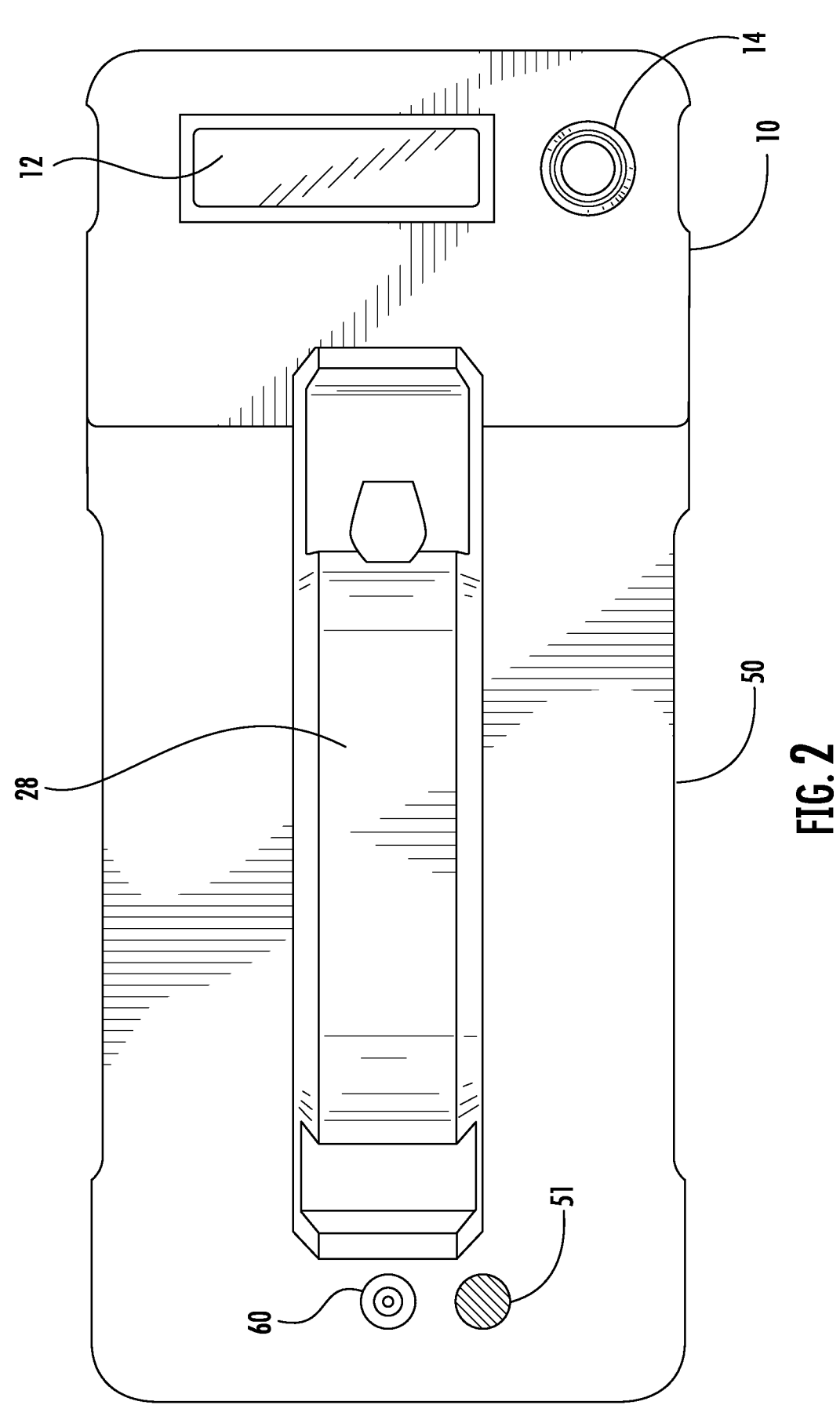
FIG. 2 is a top view of the remote controller and the housing secured together.
Figure 3:
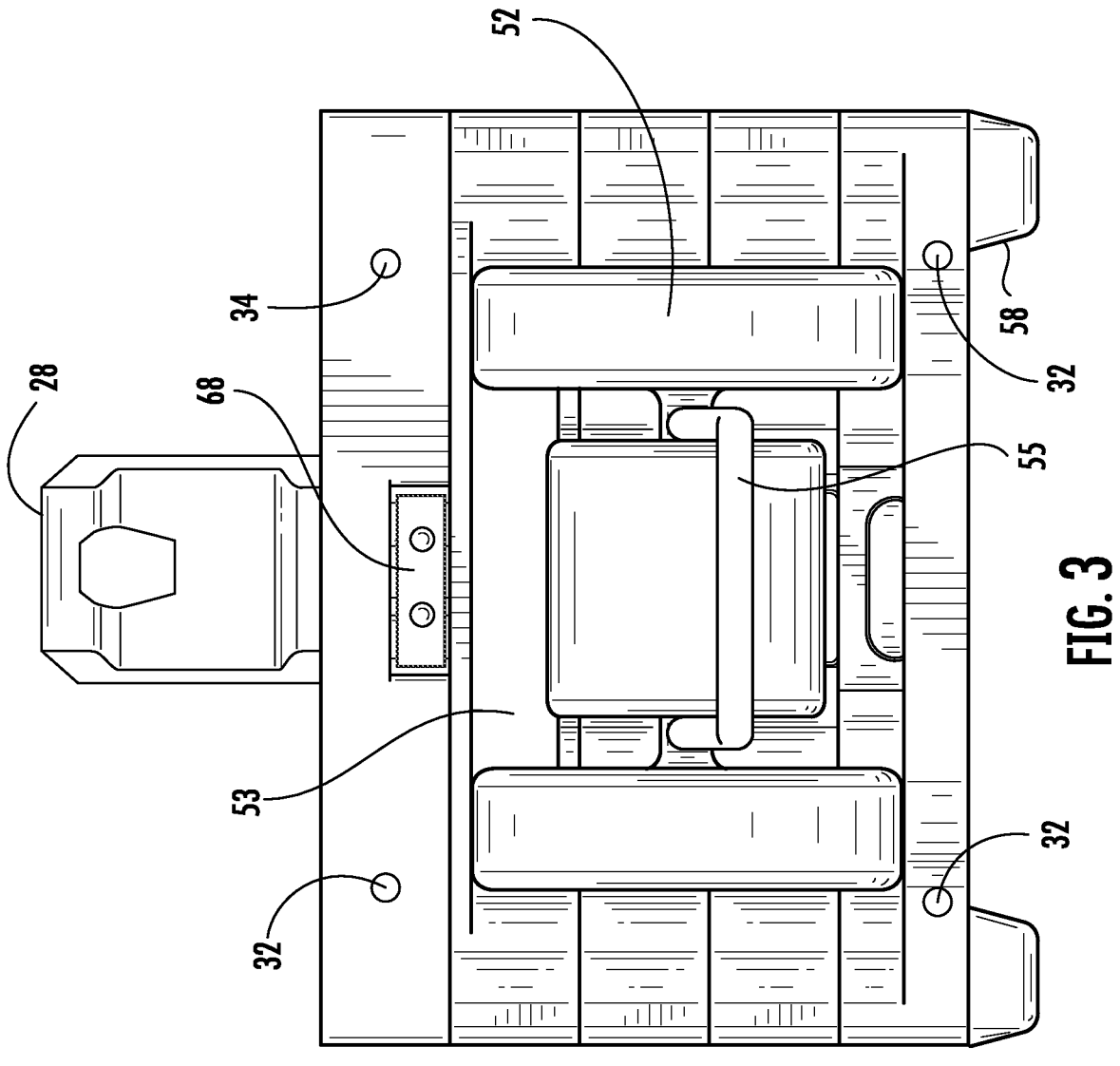
FIG. 3 is front view thereof.
Figure 4:
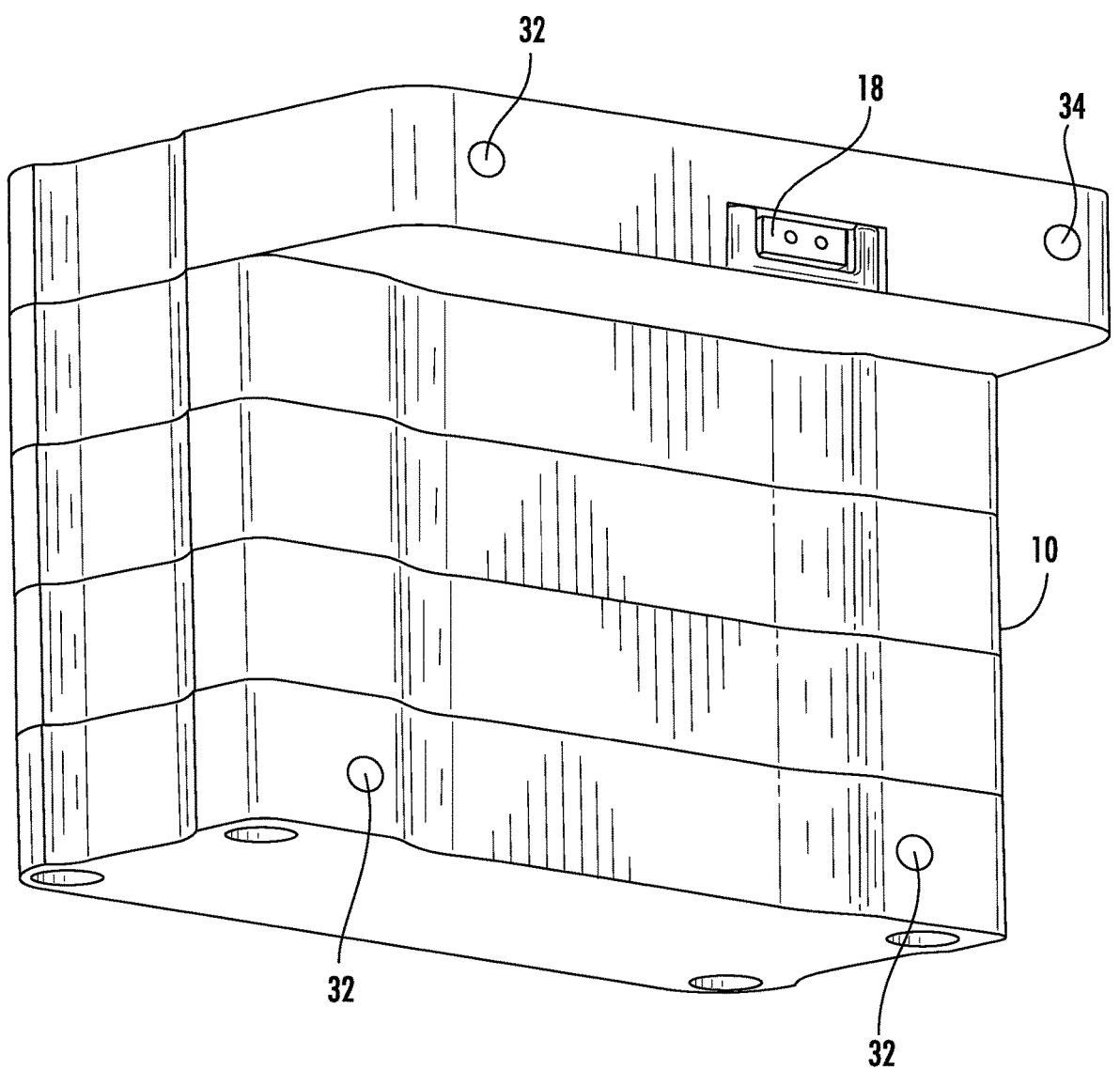
FIG. 4 is a lower perspective view of the remote controller.
Figure 5:
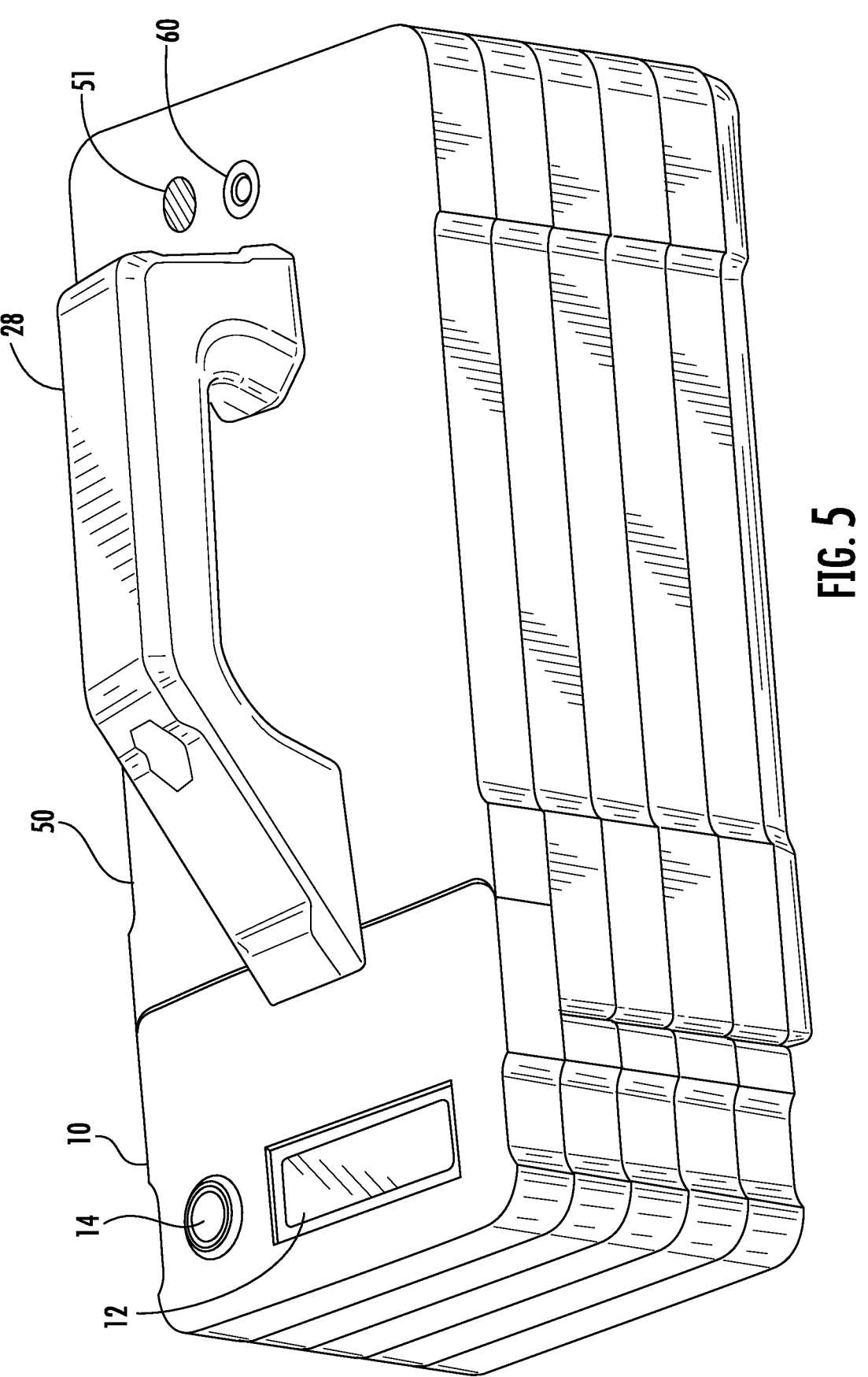
FIG. 5 is a perspective view of the remote controller and the housing.
Figure 6:
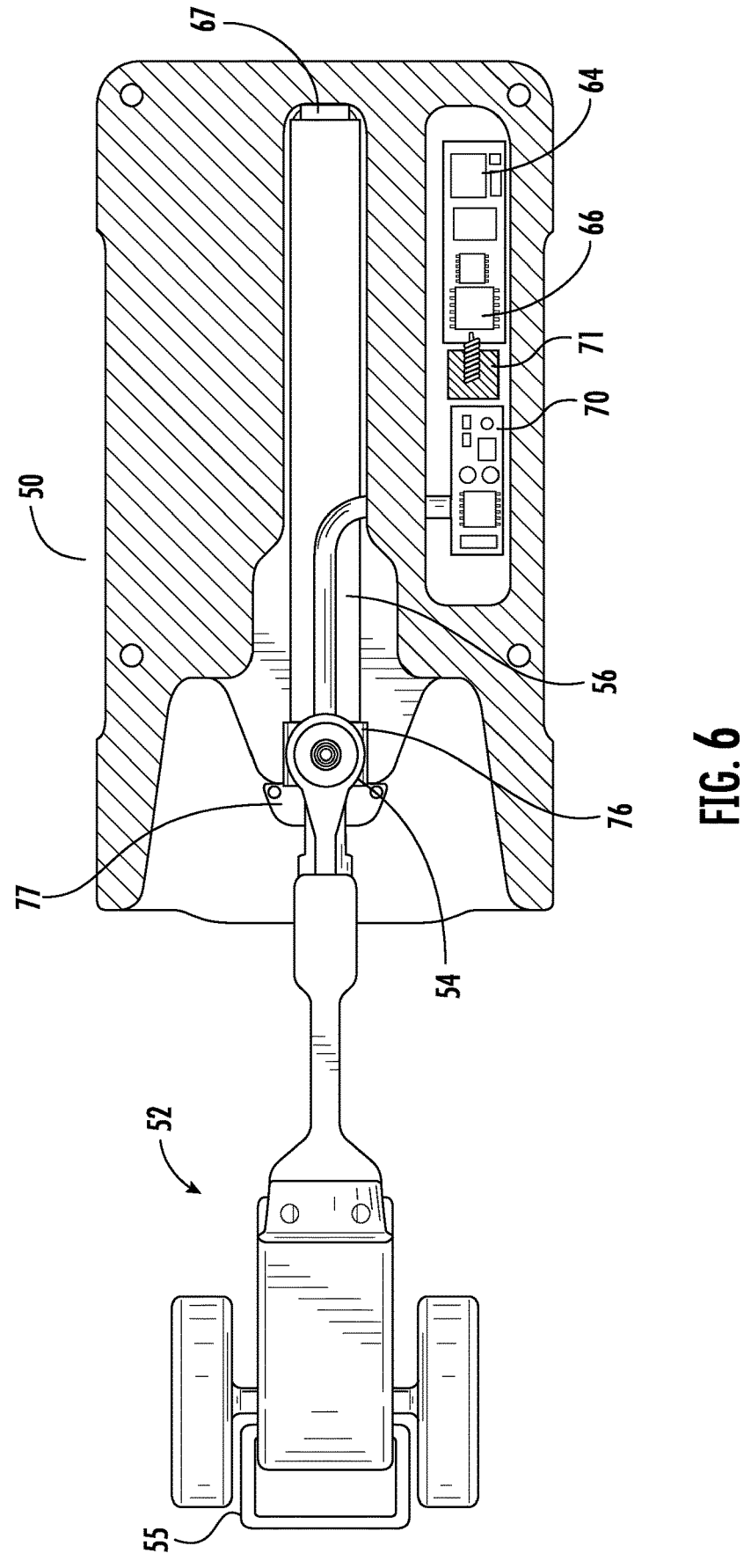
FIG. 6 is a cross sectional view of a deployable fixture.
Figure 7:
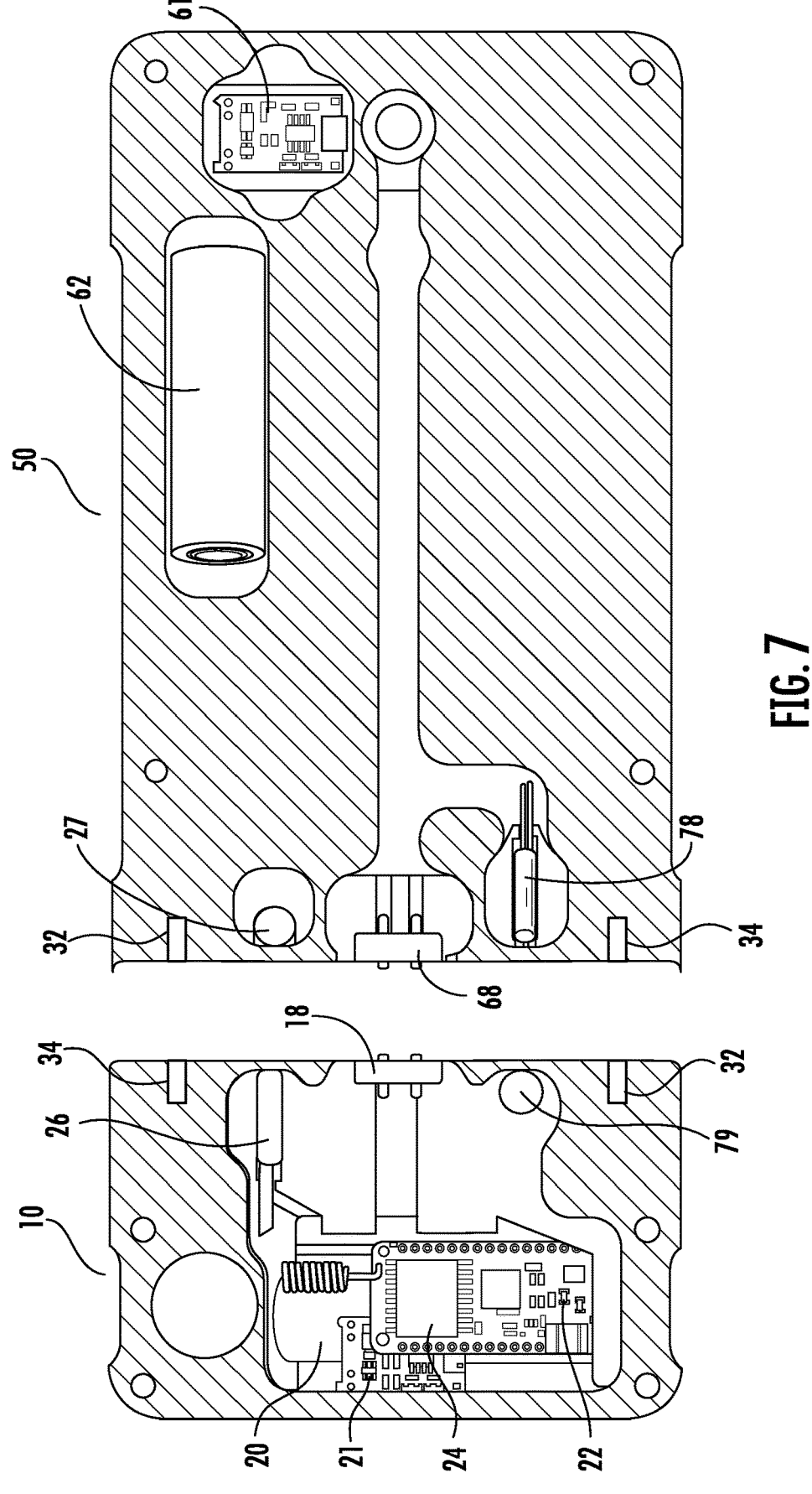
FIG. 7 is a top cross sectional view thereof.
Figure 8:
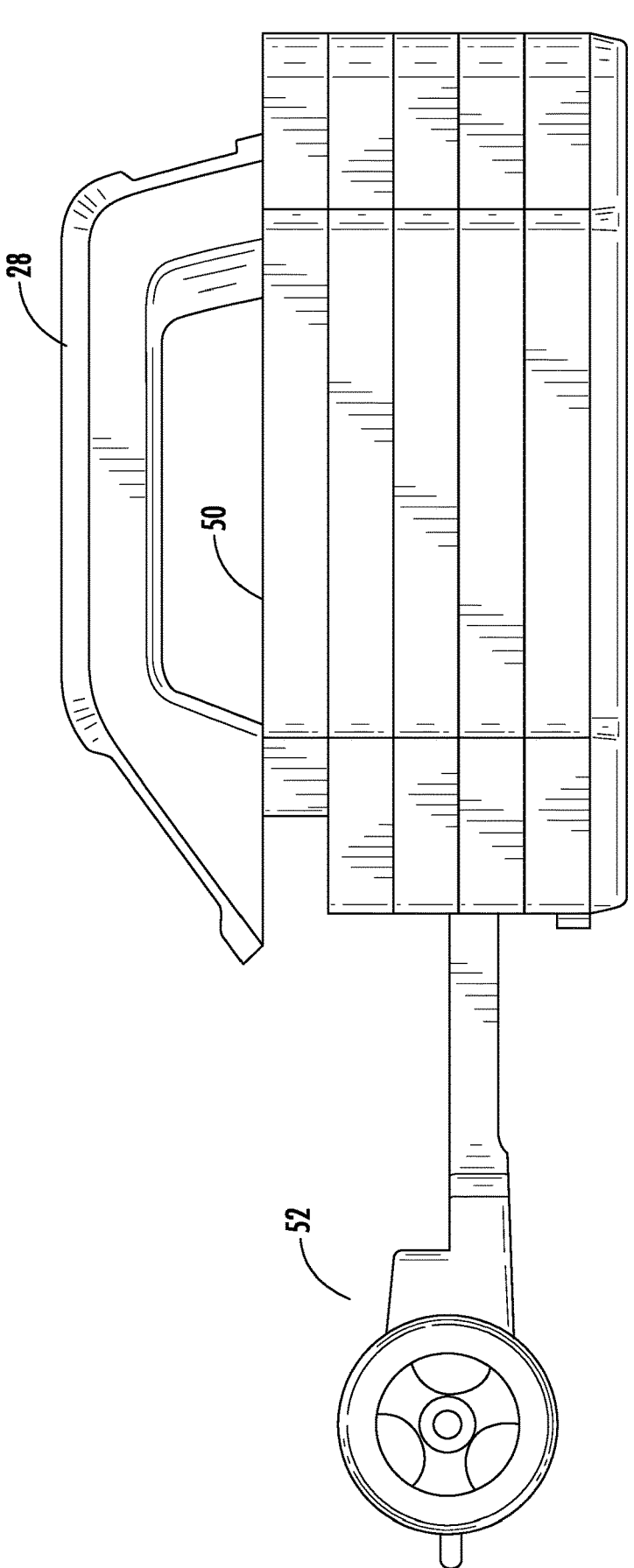
FIG. 8 is a side view thereof.
Figure 9:
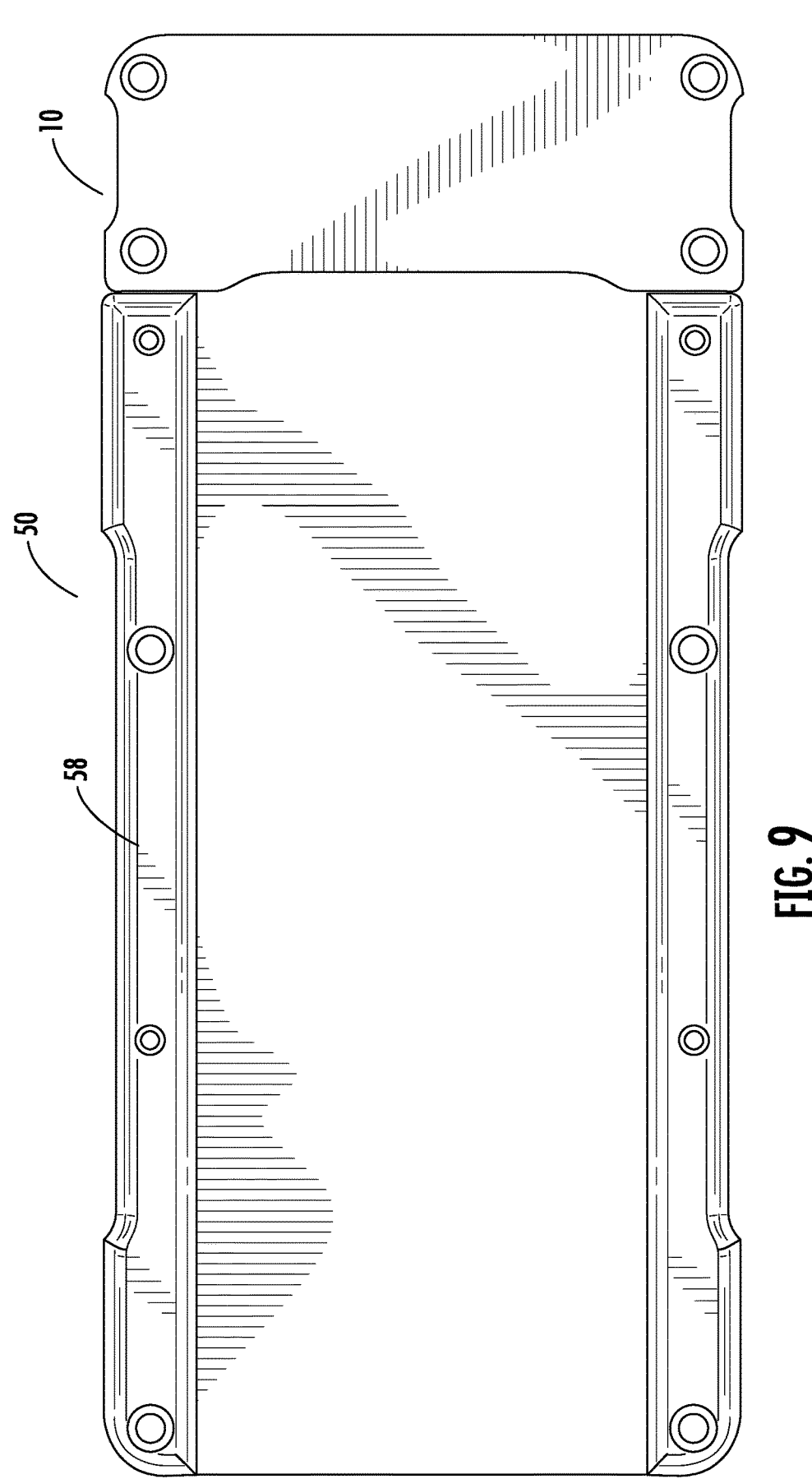
FIG. 9 is a bottom view thereof.
Figure 10:
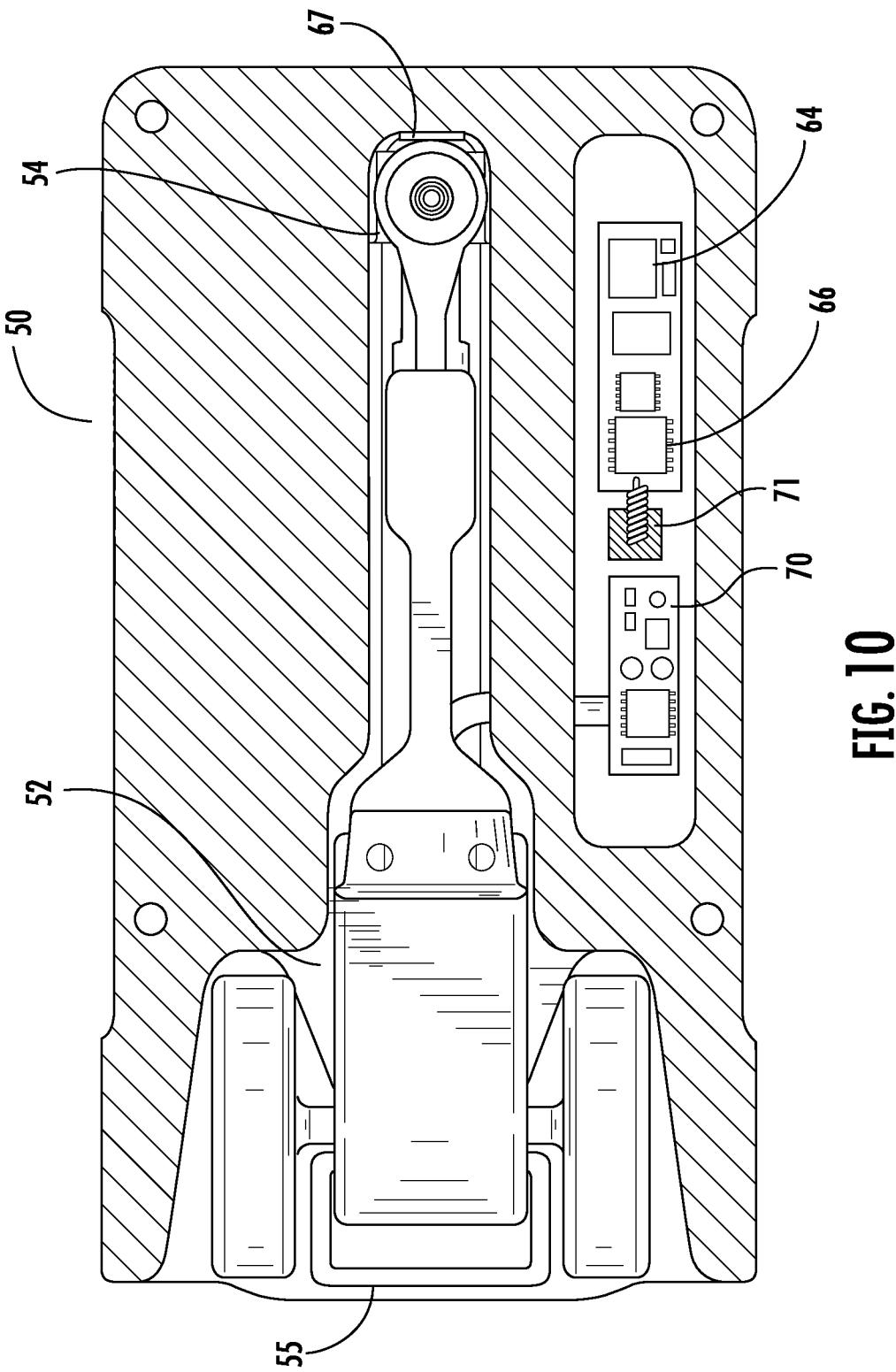
FIG. 10 is a cross section view of the deployable fixture within the housing.
Figure 11:
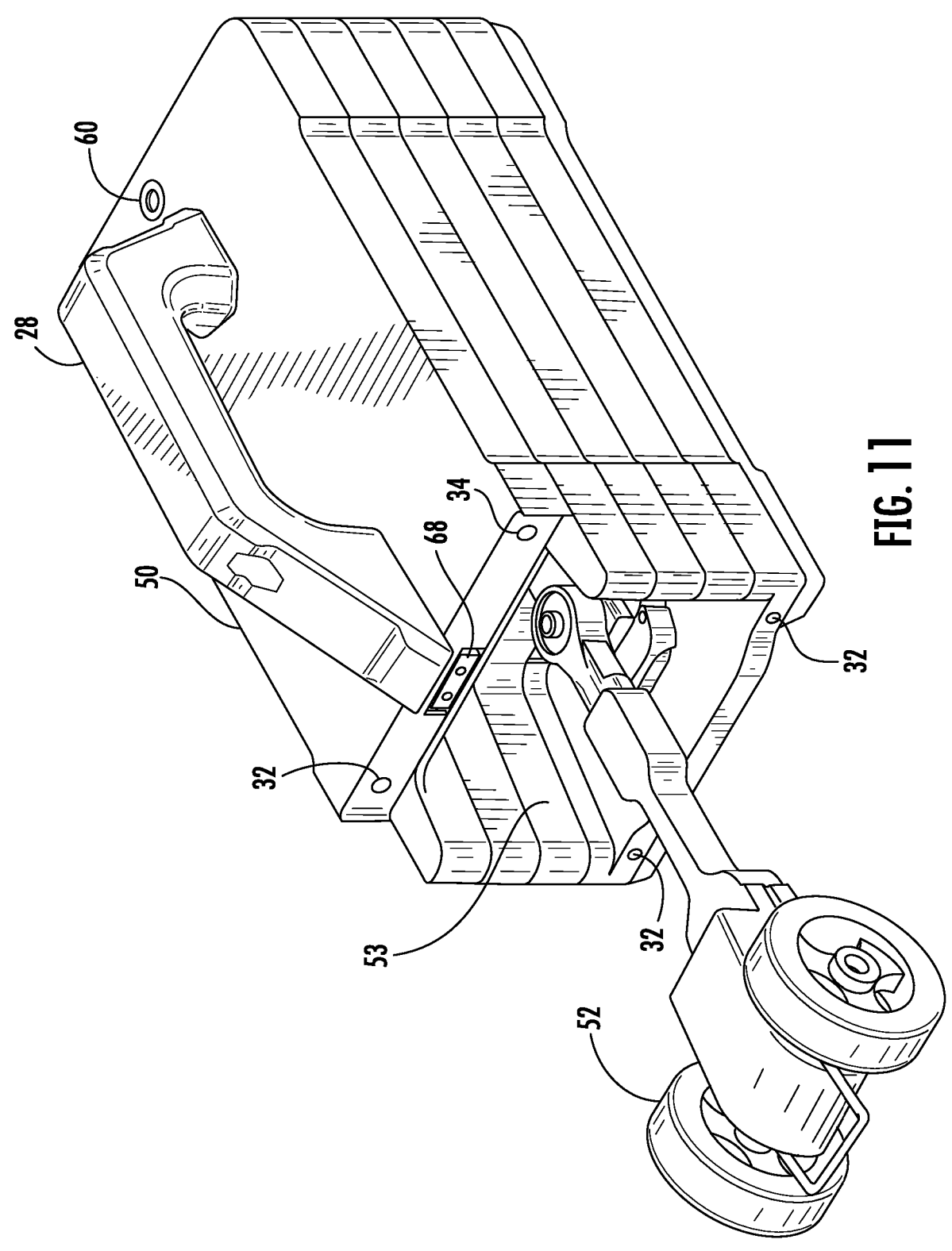
FIG. 11 is a perspective view of the deployable fixture.
Figure 12:
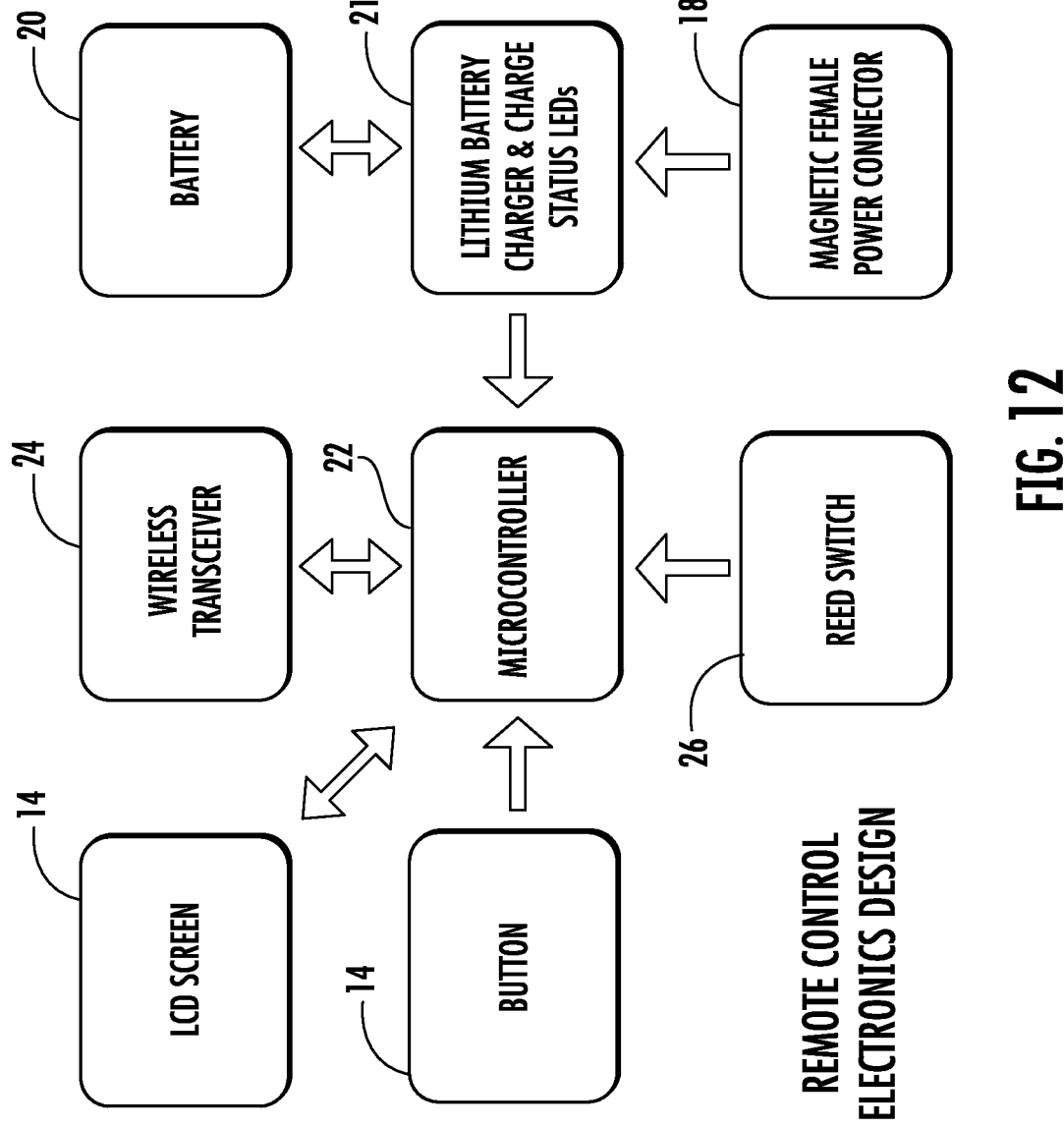
FIG. 12 is flow diagram of the remote controller electronics.
Figure 13:
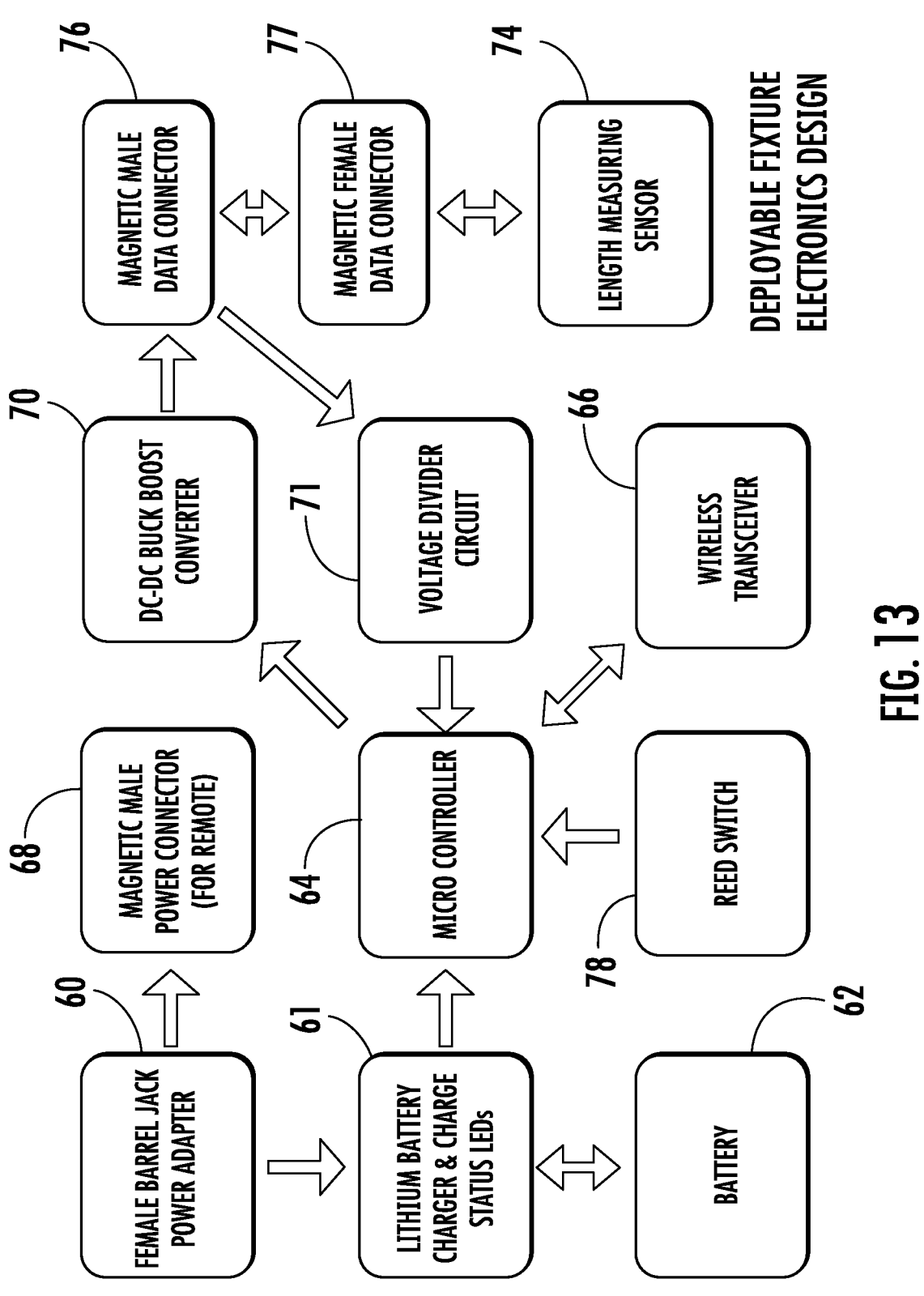
FIG. 13 is a flow diagram of the deployable fixture electronics.

A detailed embodiment of the conveyor belt calibration device is disclosed herein, however, it is to be understood that the disclosed embodiment is merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Referring to the Figures in general, illustrated is the device comprising a remote controller 10, a sensor assembly 52, and a housing 50. The remote controller 10 comprises an LCD screen 12 and a momentary button switch 14 affixed to the top surface of the remote controller 10. The location of the LCD screen 12 and the momentary button 14 is not limiting and may be placed on the front, bottom, or side surfaces of the remote controller 10. The remote controller 10 includes a body that encloses electronic circuitry powered by a rechargeable lithium battery 20. The electronic circuitry includes a microcontroller computer 22, a 900 MHz LoRa RF transceiver 24, a magnetic 2 pin charging connector 18, a lithium battery charger 21 with charge status LEDs, and a normally open reed switch 26. Embedded rare earth magnets 32 and steel rods 34 that do not interfere with the reed switch 26 are used to releasably couple the remote controller 10 to the housing 50. A reed switch magnet 27 is located inside the housing 50 that closes the reed switch 26 when the remote controller 10 is coupled to the housing 50.

The LCD screen 12 displays the distance traveled or calculated speed by the sensor or the calculated belt movement speed. The momentary button 14 allows the user to reset the current sensor reading to zero when pressed, change units of measurement when double pressed, or switch between length/speed measurement modes with a long press. When the remote controller 10 mates with the housing 50, a magnetic charger 18 connects and the reed switch 26 closes to turn off the remote. The remote 10 has a screen 12 that tilts up at an angle allowing ease of viewing if the remote 10 is placed on a flat surface during the calibration test, or for ease of use when coupled to an industrial computer system during data input.

The housing 50 comprises a length measuring sensor assembly 52 including wheels and bidirectional rotary encoder that are stored within a chamber 53. The term "length measuring sensor assembly" is used interchangeably with the term "deployable fixture". The sensor assembly 52 is attached to a ball joint 54 that rides along a linear guide track 56 and includes a grip 55 that allows a user to pull out the sensor assembly 52 with ease. In an embodiment, the bottom surface of the housing 50 includes rubberized feet 58 or the like slip resistant material, to inhibit movement of the housing. The electrical components encased within the housing 50 include a DC female barrel jack 60, a rechargeable lithium battery 62, a microcontroller computer 64, 900 MHZ LoRa RF transceiver 66, magnetic 2 pin charging connecter 68, male 76 and female 77 magnetic 3 pin data connectors, buck boost converter circuit 70, voltage divider circuit 71, lithium battery charger 61 with charge status LEDs, length sensor 74, and a reed switch 78. A reed switch magnet 79 is located inside the remote controller 10 that closes the reed switch 78 when the remote controller 10 is coupled to the housing 50. In a preferred embodiment, an LED light 51 on the housing 50 flashes red when the housing 50 is charging and the LED light flashes blue to indicate a full charge.

The rechargeable lithium battery 62 provides power to the electrical components and is charged via the lithium battery charge circuitry 61 that receives power from the female barrel jack power input 60. Power from the female barrel jack input is passed to the magnetic 2 pin charging connector 68 for the remote to charge. When the remote controller 10 is removed from the housing 50, a reed switch 78 opens, turning on the device. The length sensor 74 within the enclosure 53 connects to a ball joint 54 so it can rotate and mechanically self-align its wheels when movement begins with the conveyor belt it is measuring. When the length sensor 74 is pulled fully out, it snaps into place via the mating of the male magnetic data connector 76 and stationary female magnetic data connector 77 to keep it from moving during operation. Data is transmitted every time the wheeled length sensor 52 stops moving, or data can be sent live to the remote for instantaneous display/use.

When the sensor assembly 52 is placed within the chamber of the housing 50, a magnet 67 attracts to the ball joint 54 and keeps it in place during storage and transport. A handle 28 is provided atop the housing 50 to prevent said remote controller 10 from detaching from said housing 50, additionally six magnets 32 and two steel rods 34 that make contact between the housing and remote contact surfaces help prevent the remote controller 10 and the housing 50 from detaching. The housing 50 can be manufactured using a layer technique, suitable for CNC machining or 3D printing. Each layer having configuration constructed and arranged to fit the sensor assembly 52 and electronics within the remote controller.

Data collected from the length measuring sensor assembly 52 is compiled via a source code that reads an input from the length sensor 74 over time that is stored and incremented. The source code allows the transmission of data after measurement has been fully recorded and displays useful data onto the LCD screen 12 for the user to read. A deployable fixture unit configured to generate a unique transmitter code. Transmission using a communication protocol selected from the group consisting of LoRa, Bluetooth, Wi-Fi, and RFID. In a preferred embodiment, the deployable fixture code used in combination with a remote control code is programmed according to the following:

```
1    //James Egger
2    //Copyright © 2024
3    //Deployable Fixture Code
5    #include <SPI.h>
6    #include <RH_RF95.h>
7
8    const char FieldGatewayAddress [20] "11050230003UI ";
9    const char Deviceld [20] = "1105202300003BASE";
10   char PacketToSend [ 30] =" ";
11
12   //Set value "TRUE" to display useful data in console.
13   bool debug = false:
14
15   //Length sensor input.
16   const int input = 6;
17
18   int pulse = 0:
19   int priorPulse =0;
20   int lastVar = 0;
21   unsigned long delayStart = 0://Stores current time
22   int16_t packetnum = 0;// packet counter
23
24
25   #if defined(ADAFRUIT_FEATHER_M0 ||
defined (ADAFRUIT_FEATHER_MO_EXPRESS) || defined(Af)
26   #define RFM95_CS 8
27   #define RFM95_INT 3
28   #define RFM95_RST 4
29   #endif
30
31   #define RF95 FREQ 915.0
32
33   RH RF95 rf95 (RFM95_CS, RFM95_INT); // radio driver
34
35   void setup ( )
36
37   if (debug)
38
39   Serial.begin(115200);
40   while (!Serial) delay(1);
41   delay(100) ;
42   Serial.println("Feather LoRa TX Test!");
43
44
45   strcpy(PacketToSend, FieldGatewayAddress);
46    pinMode(RFM95_RST, OUTPUT);
47    digitalWrite(RFM95_RST, HIGH);
48   digitalWrite(RFM95_RST, LOW);
49   delay(10) ;
50    digitalWrite(RFM95_RST, HIGH);
51   delay(10); // manual reset
52
53
54   while (!rf95.init( ))
55
56   Serial.println("LoRa radio init failed");
57   Serial.println("Uncomment '#define SERIAL DEBUG'
58   while (1);
59
60
61   if(debug)
62
63   Serial.println("LoRa radio init OK!");
64
65
66    if (!rf95.setFrequency((RF95_FREQ))
67
68   Serial.println("setFrequency failed") ;
69   while (1);
70
```

6

-continued

```
71
72   if(debug)
73
74   Serial.print("Set Freq to: ");
75   Serial.println(RF95 FREQ):
76
77
78   rf95.setTxPower(13, false);
79
80   pinMode(input, INPUT_PULLUP);
81   delayStart = millis( );
82   lastVar = digitalRead(input);
83
84
85   void loop( ) {
86
87   //Read length sensor input.
89   int currentSensorValue = digitalRead(input);
90   //pulse values different, increment of millimeter has occured
91   if(currentSensorValue >= 1 && lastVar <1)
92
93   pulse++; //millimeter increment.
94   delayStart = millis( );//IReset timer.
95
96
97   else{
98
99   //Transmit data after measurement, And half second buffer
100  if(millis( ) – delayStart > 500){
101  whenToSendData( );
102      }
103
104
105  lastVar = currentSensorValue;
106
107
108
109
110  void whenToSendData( ) {
111
112
113  if(pulse==priorPulse)
114
115  //If last value the same value currently, skip data
116
117
118  else{
119  itoa(pulse,PacketToSend+16, 10) ;
120
121  rf95.send((uint8_ t *)PacketToSend, sizeof(PacketToSend));
122
123  if(debug)
124
125  Serial.println(PacketToSend);
126
127
128  priorPulse pulse;
129
```

A remote control unit is configured to receive the deployable fixture code. In a preferred embodiment, the remote control code is programmed according to the following:

```
1    //James Egger
2    //Copyright © 2024
3    //Remote Control Code
4
5    #include <SPI.h>
6     #include <RH _RF95.h>
7     #include <LiquidCrystal_I2C.h>
8
9    const char FieldGatewayAddress[20] = "11052023000003BASE ";
10   const char Deviceld[20] = {"11052023000UI"};
11   char PacketToReceive[30] = " ";
12
13
14   //ISet value "true" to display useful data in console.
```

```
15    bool debug = false;
16
17    //I Set LCD address to 0x27 for a 16 char 2 line display.
18      LiquidCrystal_I2C lcd(0x27, 20, 2);
19
20    cons in buttonInput = 6
21    int inboundData = 0;
22    int zeroOut 0 ·I
23    int ValueToDisplay =0
24
25    #if defined (ADAFRUIT FEATHER M0) ||
defined (ADAFRUIT_FEATHER_M0_EXPRESS) || defined(Af)
26    #define RFM95_CS 8
27    #define RFM95 INT 3
28    #define RFM95 RST 4
29    #endif
30
31    // Change to 434.0 or other frequency, must match RX's freq!
32    #define RF95_FREQ 915. 0
33
34    Singleton instance of the radio driver
35    RH _RF95 rf95(RFM95_CS, RFM95_INT);
36
37    void setup( ) {
38
39
40    if (debug)
41    {
42    Serial.begin(115200);
43    while (!Serial) delay(1);
44    delay (100);
45    Serial.println("Feather LoRa RX Test !");
46    }
47
48    pinMode(LED_BUILTIN, OUTPUT);
49      pinMode(REM95_RST, OUTPUT);
50    digitalWrite(RFM95_RST, HIGH);
51
52    // manual reset
53    digitalWrite(RFM95_RST, LOW);
54    delay(10);
55    digitalWrite(RFM95_RST, HIGH);
56    delay(10) ;
57
58
59    while (!rf95.init( ))
60    {
61    Serial.println("LoRa radio init failed") ;
62    Serial.printlri("Uncomment ' #define SERIAL DEBUG' in
RH_RF95.cpp for detailed debut
63    while (1);
64    }
65
66    if (debug)
67    {
68    Serial.println("LoRa radio init OK!");
69    }
70
71    if (!rf95.setFrequency(RF95_FREQ))
72    {
73    Serial.Println("setFrequency failed");
74    while (1);
75
76
77    if (debug)
78    {
79    Serial.print("Set Freq to: ");
80    Serial. println(RF95_FREQ);
81    }
82
83    rf95.setTxPower(13, false);
84
85    pinMode(buttonInput, INPUT_PULLUP);
86
87    lcd.init( );
88    led. backlight ( );
89    led.clear( );
90    lcd.setCursor(0, 0);
91    lcd.print("Value in mm: ");
```

```
92    led.setCursor(0, 1);
93    lcd.print("0");
94
95    }
96
97    void loop( ) {
98
99    //Zeros out display
100   int buttonReset = digitalRead(buttonInput);
101   if (!buttonReset)
102   {
103   zeroOut = inboundData;
104
105   led.setCursor(0, 1);
106   lcd.print("0 ");
107
108   if (debug)
109   {
110   Serial.print("Zero Out: ");
111   Serial.println(zeroOut);
112   }
113
114   delay(100) ;
115   }
116
117   if (rf95.available( ))
118   {
119
120   uint8_tbuf[30];
121   uint8_t len = sizeof(buf);
122
123   if (rf95.recv(buf, &len))
124   {
125   //IRH_RF95::printBuffer( "Received ", buf, len);
126
127   memcpy(PacketToReceive,buf,30);
128
129
130   char inboundDataAddress[16];
131   strncpy(inboundDataAddress, PacketToReceive, 15);
132   inboundDataAddress[15] = '\0';
133
134   if (debug)
135   {
136   Serial.println(inboundDataAddress);
137   }
138
139   if(strcmp(inboundDataAddress,DeviceId)==0)
140   {
141
142   char inboundDataSubstr[16]; // Make sure it's large enough for
the slice
143   strncpy(inboundDataSubstr, &PacketToReceive[15] , 15);
144   inboundDataSubstr[15] = '\0';
145
146   inboundData = atoi(inboundDataSubstr);
147
148   if (inboundData < zeroOut)
149   {
150   zeroOut = 0;
151
152   if (debug) {
153   Serial.print("Zero Out Forced: " ) ;
154   Serial.println(zeroOut);
155   }
156
157   ValueToDisplay = inboundData;
158
159   }
160
161   else
162   }
163   ValueToDisplay = inboundData – zeroOut ;
164   }
165
166
167   if (debug)
168   {
169   Serial.print("Received: ");
```

9

-continued

```
170    Serial.println(inboundData);
171    Serial.print("Display: ");
172    Serial.println(ValueToDisplay);
173    }
174
175    lcd.setCursor(0, 1);
176    lcd.print("0 ") ;
177    lcd.setCursor(0, 1);
178    lcd.print(ValueToDisplay);
179            }
180          }
181        };
182    }
```

In operation, the remote control 10 is detached from the housing 50 exposing the chamber housing the sensor assembly 52. The housing 50 is positioned adjacent to a conveyor belt and the sensor assembly 52 is partially withdrawn from the housing chamber 53 and placed on the conveyor belt to be tested. The sensor assembly 52 detects the wheel movement in accordance with the conveyor belt movement; the data collected is transmitted to the remote controller via radio frequency. Programming within the microprocessor interprets the data providing a visual output to the screen 12 and makes ready a data output that can be inputted to the conveyor belt control system to make any adjustments as determined necessary by the data. The sensor assembly 52 can be returned to the chamber 53 and the remote controller secured to the housing enclosing the sensor assembly within the chamber 53.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims.

What is claimed is:

1. A conveyor belt calibration device comprising:
   a housing defining an internal chamber and enclosing electronic components including a microcontroller computer, a rechargeable lithium battery, a LoRa RF transceiver, magnetic two-pin charging connector, and a reed switch;
   a sensor assembly removably secured within said chamber, said sensor assembly including at least one wheel-based length sensor coupled to a ball joint and a linear guide track, said length sensor configured to generate a signal corresponding to movement of a conveyor belt when said sensor assembly is withdrawn from said chamber and placed on said conveyor belt; and
   a remote controller magnetically attachable to said housing and including a display and a user-input button, said remote controller being configured to receive the signal from said sensor assembly and to display a measured distance or calculated belt speed;
   wherein detachment of said remote controller from said housing activates said electronic components and enables wireless communication between said remote controller and said sensor assembly for measuring conveyor-belt movement.

2. The device of claim 1, wherein said remote controller includes an LCD display configured to present a distance traveled or calculated belt speed based on data received from said length sensor of said sensor assembly.

3. The device of claim 1, wherein said user-input button is configured to reset a current sensor reading to zero when pressed, to change a unit of measurement when double pressed, and to toggle between length-measurement and speed-measurement modes when long-pressed.

4. The device of claim 2, wherein said LCD display is configured to tilt upward at an angle relative to said housing for ease of viewing.

5. The device of claim 1, wherein said housing includes slip-resistant feet configured to inhibit movement of said housing during calibration.

6. The device of claim 1, wherein said rechargeable lithium battery is configured to be recharged through said magnetic two-pin charging connector when said remote controller is attached to said housing.

7. The device of claim 1, wherein said reed switch is configured to open when said remote controller is removed from said housing.

8. The device of claim 1, wherein said length sensor is connected to a ball joint and is configured to rotate and mechanically self-align its wheels when movement of the conveyor belt begins.

9. The device of claim 1, wherein said length sensor assembly is configured to engage a magnetic data connector to secure said sensor assembly in an operating position when withdrawn from said chamber.

10. The device of claim 1, wherein said housing includes a handle positioned atop said housing and configured to prevent said remote controller from detaching from said housing.

11. The device of claim 1, wherein said microcontroller executes a source code configured to read inputs from said length sensor over time and to incrementally store and compile the data.

12. The device of claim 11, wherein said microcontroller communicates with said remote controller using a communication protocol selected from the group consisting of LoRa, Bluetooth, Wi-Fi, and RFID.

13. A conveyor belt calibration device comprising:
   a housing defining an internal chamber and enclosing electronic components including a microcontroller, a rechargeable lithium battery, a LoRa RF transceiver, a magnetic two-pin charging connector, and a reed switch;
   a sensor assembly removably secured within said chamber, said sensor assembly including at least one wheel-based length sensor coupled to a ball joint and a linear guide track, said length sensor configured to generate a signal corresponding to movement of a conveyor belt when said sensor assembly is withdrawn from said chamber and placed on said conveyor belt; and
   a remote controller magnetically attachable to said housing and including an LCD display configured to tilt upward at an angle relative to said housing for ease of viewing, and a user-input button, said remote controller being configured to receive the signal from said sensor assembly and to display a measured distance or calculated belt speed;

wherein said microcontroller executes a source code configured to read inputs from said length sensor over time and incrementally store and compile the data.

14. The device of claim 13, wherein said microcontroller communicates with said remote controller using a communication protocol selected from the group consisting of LoRa, Bluetooth, Wi-Fi, and RFID.

15. The device of claim 13, wherein said reed switch opens when said remote controller is removed from said housing.

16. The device of claim 13, wherein said sensor assembly is configured to engage a magnetic data connector to secure said sensor assembly in an operating position when withdrawn from said chamber.

17. The device of claim 13, wherein said housing includes a handle positioned atop said housing and configured to prevent said remote controller from detaching from said housing.

18. The device of claim 13, wherein said housing includes slip-resistant feet configured to inhibit movement of said housing during calibration.

19. The device of claim 13, wherein said rechargeable lithium battery is configured to be recharged through said magnetic two-pin charging connector when said remote controller is attached to said housing.

20. The device of claim 13, wherein data transmission from said sensor assembly to said remote controller occurs when said wheel-based length sensor ceases movement on said conveyor belt.

*    *    *    *    *